United States Patent
Song et al.

(10) Patent No.: US 6,841,963 B2
(45) Date of Patent: Jan. 11, 2005

(54) ROBOT CLEANER, SYSTEM THEREOF AND METHOD FOR CONTROLLING SAME

(75) Inventors: Jeong-gon Song, Gwangju (KR);
Kwang-su Kim, Gwangju (KR);
Jang-youn Ko, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 297 days.

(21) Appl. No.: 10/079,153

(22) Filed: Feb. 20, 2002

(65) Prior Publication Data

US 2003/0028993 A1 Feb. 13, 2003

(30) Foreign Application Priority Data

Aug. 7, 2001 (KR) ........................................ 2001-47426

(51) Int. Cl.[7] ............................. B25J 5/00; G05B 19/00
(52) U.S. Cl. ................. 318/568.12; 318/580; 318/581; 318/587; 700/245; 700/259; 15/319
(58) Field of Search ........................... 318/568.12, 587, 318/139; 901/1; 180/79.1; 15/319, 320; 701/220; 700/245, 247, 256, 258

(56) References Cited

U.S. PATENT DOCUMENTS

| | | | |
|---|---|---|---|
| 3,010,129 A | | 11/1961 | Moore |
| 3,763,955 A | | 10/1973 | Schroder et al. |
| 4,361,202 A | | 11/1982 | Minovitch |
| 4,472,716 A | * | 9/1984 | Hansen ........................ 340/905 |
| 4,613,804 A | * | 9/1986 | Swenson ...................... 318/587 |
| 4,638,445 A | * | 1/1987 | Mattaboni ..................... 701/23 |
| 4,674,048 A | * | 6/1987 | Okumura ...................... 701/25 |
| 4,700,427 A | | 10/1987 | Knepper |
| 4,716,530 A | * | 12/1987 | Ogawa et al. ................. 701/23 |
| 4,790,402 A | * | 12/1988 | Field et al. .................. 180/169 |
| 4,990,841 A | * | 2/1991 | Elder .......................... 318/587 |
| 5,001,635 A | | 3/1991 | Yasutomi et al. |
| 5,023,788 A | * | 6/1991 | Kitazume et al. .............. 701/82 |
| 5,032,994 A | * | 7/1991 | Wellman ....................... 701/23 |
| 5,036,935 A | * | 8/1991 | Kohara ........................ 180/168 |
| 5,068,791 A | * | 11/1991 | Klopfleisch et al. .......... 701/23 |
| 5,109,566 A | | 5/1992 | Kobayashi et al. |
| 5,189,612 A | | 2/1993 | Lemercier et al. |
| 5,239,249 A | * | 8/1993 | Ono ........................... 318/587 |
| 5,321,614 A | * | 6/1994 | Ashworth ..................... 701/26 |
| 5,341,540 A | * | 8/1994 | Soupert et al. ............... 15/319 |
| 5,377,106 A | * | 12/1994 | Drunk et al. ................. 701/25 |
| 5,387,853 A | * | 2/1995 | Ono ........................... 318/587 |
| 5,440,216 A | | 8/1995 | Kim |
| 5,622,236 A | | 4/1997 | Azumi et al. |
| 5,650,702 A | | 7/1997 | Azumi |
| 5,963,002 A | * | 10/1999 | Hartov ................... 318/568.12 |
| 6,459,955 B1 | * | 10/2002 | Bartsch et al. .............. 700/245 |
| 6,459,990 B1 | * | 10/2002 | McCall et al. ............... 701/220 |
| 6,477,465 B1 | * | 11/2002 | McCall et al. ............... 701/220 |
| 6,496,754 B2 | * | 12/2002 | Song et al. .................. 700/245 |
| 2003/0025472 A1 | * | 2/2003 | Jones et al. ............. 318/568.12 |

FOREIGN PATENT DOCUMENTS

| | | |
|---|---|---|
| DE | 2059659 | 4/1970 |
| DE | 3889474 | 11/1994 |

(List continued on next page.)

*Primary Examiner*—Paul Ip
(74) *Attorney, Agent, or Firm*—Ladas & Parry LLP (57) ABSTRACT

A robot cleaner, a system thereof, and a method for controlling the same. The robot cleaner system includes a robot cleaner that performs a cleaning operation while communicating wirelessly with an external device. The robot cleaner has a plurality of proximity switches arranged in a row on a lower portion of the cleaner body. A guiding plate is disposed in the floor of the work area, the guiding plate having metal lines formed in a predetermined pattern, the metal lines being detectible by the proximity switches. Since the recognition of the location and the determination of traveling trajectory of the cleaner within a work area becomes easier, performance of the robot cleaner is enhanced, while a burden of having to process algorithms is lessened.

13 Claims, 7 Drawing Sheets

FOREIGN PATENT DOCUMENTS

| | | | |
|---|---|---|---|
| DE | 9117018 | | 9/1996 |
| DE | 9501130 | | 3/1998 |
| EP | 0208384 | | 1/1987 |
| EP | 0278853 | | 8/1988 |
| EP | 0687964 | | 12/1995 |
| GB | 2313190 | | 11/1997 |
| GB | 2344900 | | 6/2000 |
| GB | 2376536 | | 12/2002 |
| JP | 57-107135 | | 7/1982 |
| JP | 9108116 | | 6/1984 |
| JP | 5-100742 | * | 4/1993 |
| JP | 5-224745 | * | 9/1993 |
| JP | 5-224746 | * | 9/1993 |
| JP | 5-250032 | * | 9/1993 |
| JP | 7 191723 | | 7/1995 |
| JP | 9-271105 | | 10/1997 |
| JP | 10 105234 | | 4/1998 |
| JP | 11 143534 | | 5/1999 |
| JP | 11 353023 | | 12/1999 |
| JP | 2000 207215 | | 7/2000 |
| JP | 2000-353013 | | 12/2000 |
| WO | 9014788 | | 12/1990 |
| WO | WO9109356 | | 6/1991 |

* cited by examiner

ROBOT CLEANER, SYSTEM THEREOF AND METHOD FOR CONTROLLING SAME

BACKGROUND OF THE INVENTION

1. Field of the Invention

The present invention relates generally to a robot cleaner, a system thereof, and a method for controlling the same, and more particularly to a robot cleaner, a system thereof, and a method for controlling the same, capable of directing the robot cleaner to a targeting location easily by obtaining geographical information of the targeting work area.

2. Description of the Related Art

Generally, without manipulation of a user, a robot cleaner automatically travels along a cleaning surface within a targeted cleaning area while drawing in foreign substances such as dirt or dust from the cleaning surface.

During the cleaning process, the robot cleaner senses a distance to obstacles such as furniture, walls, etc., and alters its direction of travel based on the sensed information so as not to collide with the obstacles.

In order to ensure that the whole work area is covered by the robot cleaner, the robot cleaner is required to recognize its relational position with respect to the work area.

Although there have been many studies concerning ways to have the robot cleaner recognize the relational position by memorizing images of circumstances through a camera equipped thereto, due to the considerably burdensome algorithms for image recognition process, and a high possibility of having position recognizing errors generated by changes in the surroundings, the accuracy of the image recognition process has not been enhanced, and commercialization thereof has been deterred.

SUMMARY OF THE INVENTION

The present invention has been made to overcome the above-mentioned problems of the related art, and accordingly, it is an object of the present invention to provide a robot cleaner, a system thereof, and a method for controlling the same, capable of not only of accurately recognizing a position thereof but also of reducing the burden of having to process algorithms for position recognition.

The above object is accomplished by a robot cleaner that is performing a cleaning operation, which wirelessly communicates with an external device. The robot cleaner, in accordance with the present invention, includes a driving portion that drives a plurality of wheels mounted on a body of the robot cleaner, a dust collecting portion mounted on the body for collecting dust from a floor surface within a work area, a plurality of proximity switches arranged on a lower surface of the body facing the floor surface spaced at a predetermined distance from each other, the plurality of proximity switches detect the existence of a metal member, in a direction toward the floor surface, and a controlling portion that calculates a traveling distance and a traveling trajectory by using an output signal from the proximity switches during the traveling, and controls the driving portion so that the driving portion performs an assigned job by using the calculated trajectory.

The proximity switches include an oscillator that oscillates through a detection coil, a wave detector that detects the amplitude of oscillation from the wave detection coil, and an integrator that integrates and outputs a signal outputted through a wave detecting circuit.

The proximity switches are disposed in a row along a line that connects axes of wheels, which are opposed to each other.

The proximity switches are arranged in an odd number pattern such that one proximity switch is placed in a middle of the axis connecting line and the rest of the proximity switches are placed on either side next to the one proximity switch in a symmetrical manner.

The above object is also accomplished by a robot cleaner system, in accordance with the present invention, including a robot cleaner that performs a cleaning operation while communicating wirelessly with an external device, the robot cleaner having a plurality of proximity switches arranged on a lower portion of the body of the cleaner, in a row, and a guiding plate disposed in a floor of work area, the guiding plate has metal lines, which are formed in a predetermined pattern, the metal lines being detectible by the proximity switches.

The metal lines are formed on a lower surface of the guiding plate.

The above object is also accomplished by a method for controlling a robot cleaner, the robot cleaner recognizing its direction of travel by using a detection signal detected by a plurality of proximity switches arranged on a lower surface of the body of the cleaner, at a predetermined space from each other, from metal lines formed on the floor surface of a work area in a predetermined pattern. The controlling method in accordance with the present invention includes the steps of generating and saving a pattern map of the metal lines while moving the robot cleaner within the work area, when inputted with an operation request signal, recognizing a location of the robot cleaner by comparing the pattern map with the detection signal detected by the proximity switches, calculating a traveling path from the recognized location to a targeting location, and moving the robot cleaner along the calculated traveling path.

At least three proximity switches are arranged along a line that connects the axes of wheels of the robot cleaner, which are opposed to each other, in a row and in a symmetrical manner. The controlling method in accordance with the present invention includes the steps of temporarily stopping the travel of the robot cleaner and calculating trajectory adjustment coordinates, when the detection signal is received from the outermost proximity switches, including any change of direction and straightforward moving direction that are required for the metal line detection by the proximity switch arranged in the middle, moving the robot cleaner in accordance with the trajectory adjustment coordinates, and when the metal lines are detected by the proximity switch in the middle, continuing the operation.

BRIEF DESCRIPTION OF THE DRAWINGS

The above-mentioned objects and the feature of the present invention will be more apparent by describing the preferred embodiment of the present invention in detail, referring to the appended drawings, in which.

DETAILED DESCRIPTION OF PREFERRED EMBODIMENTS

A detailed description of a robot cleaner, a system thereof, and a controlling method in accordance with the preferred embodiment of the present invention is described in further detail below, referring to the attached drawings.

Figure 1:
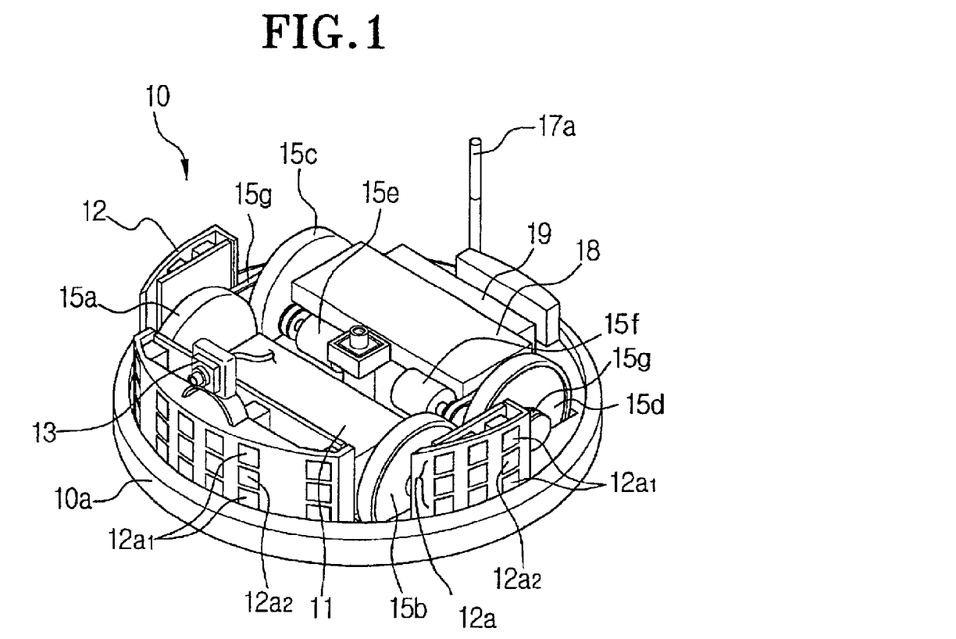
FIG. 1 is a perspective view showing an uncovered robot cleaner in accordance with the present invention.
Figure 2:
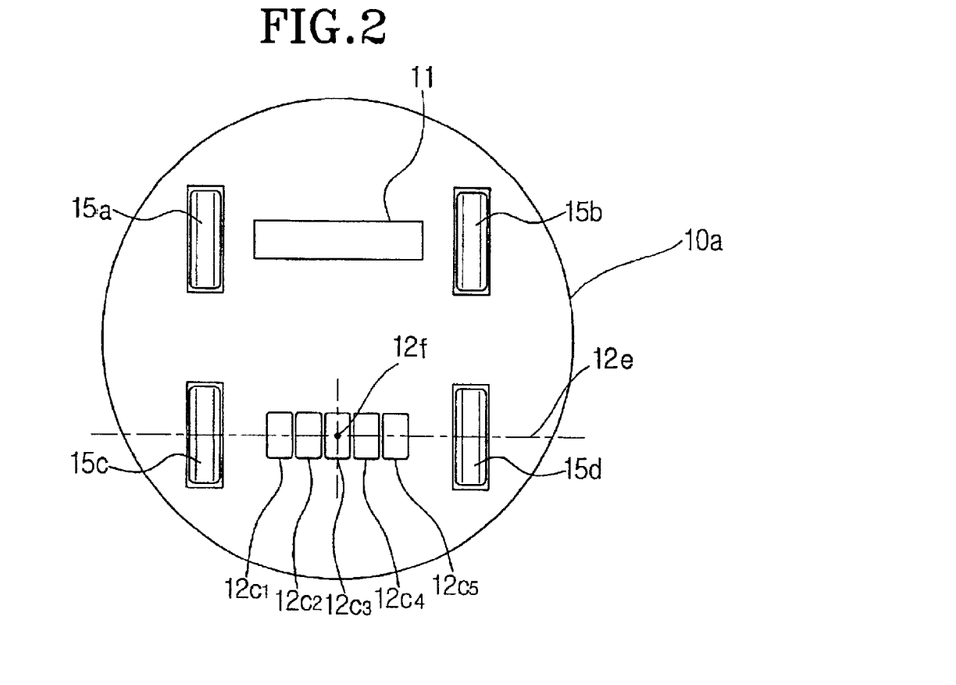
FIG. 2 is a bottom view schematically showing the robot cleaner of FIG. 1.
Figure 3:
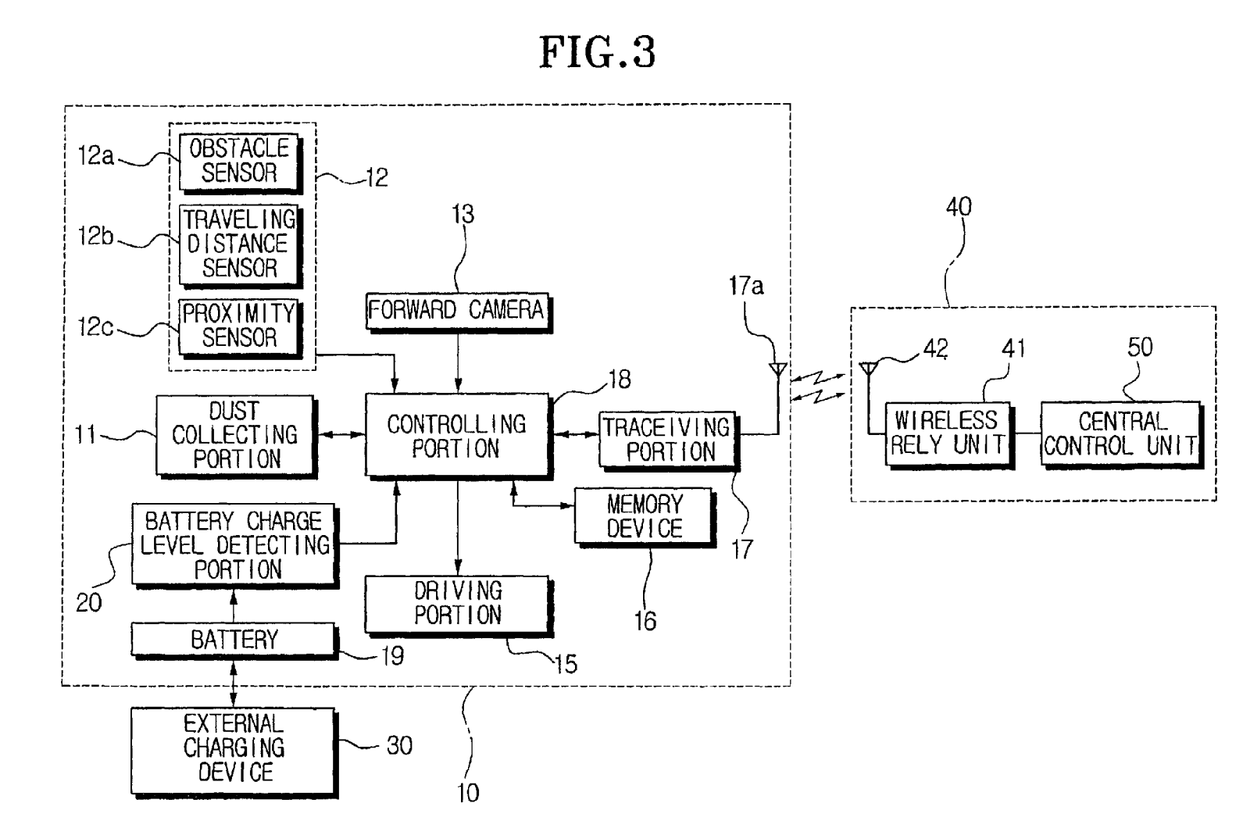
FIG. 3 is a block diagram showing a robot cleaner system employing the robot cleaner shown in FIG. 1.

FIG. 1 is a perspective view of a robot cleaner in accordance with the preferred embodiment of the present invention, in which the cover normally covering the robot system is separated therefrom. FIG. 2 is a bottom schematic view of the robot cleaner shown in FIG. 1, and FIG. 3 is a block diagram showing a robot cleaner system employing the robot cleaner shown in FIG. 1.

As shown in FIG. 1, the robot cleaner 10 includes a dust collecting portion 11, a sensor portion 12, a forward camera 13, a driving portion 15, a memory device 16, a transceiving portion 17, a controlling portion 18, and a battery 19.

The dust collecting portion 11 is mounted on a body 10a of the robot cleaner 10, to collect dust from the cleaning surface while ambient air is drawn in by a standard vacuum cleaner mechanism. The dust collecting portion 11 can be constructed in many ways with generally-known methods. For example, the dust collecting portion 11 may include a suction motor (not shown) and a dust collecting chamber that collects dust drawn in through a suction port or suction pipe (not shown) during the driving of the suction motor. The suction port or suction pipe is formed to face the cleaning surface.

The sensor portion 12 includes obstacle sensors 12a, formed on a surface of the body 10a at a predetermined distance from each other, and are used for emitting a signal and receiving a reflected signal, a traveling distance sensor 12b for sensing the traveling distance, and proximity switches 12c.

The obstacle sensors 12a include light emitting elements 12a1 that emit light and light receiving elements 12a2 that receive reflected light, which are arranged along an external circumference of the obstacle sensor 12a at a predetermined distance from each other and in vertical rows. Alternatively, the obstacle sensors 12a may be an ultrasonic sensor that emits ultrasonic waves and receives reflected ultrasonic waves. The obstacle sensors 12a are also used to measure a distance to the obstacle or to the wall.

The distance sensors 12b may be a RPM sensor that senses the revolutions per minute (RPM) of wheels 15a through 15d. For example, the RPM sensor may be an encoder that detects the RPM of the motors 15e and 15f. The distance traveled is calculated by the multiplying the revolutions per minute and the time traveled at that RPM. The distance traveled may also be calculated by taking the input from a distance sensor that counts the number of revolutions the wheels make and multiplying that input by the known circumference of the wheels.

As shown in FIG. 2, a plurality of proximity switches 12c1–12c5, also sometimes referred to herein as 12c, are arranged on a lower surface of the body 10a, facing the surface of the work area to be cleaned.

Preferably, the proximity switches 12c are arranged at a predetermined distance from each other in a symmetrical pattern, following an imaginary line, such as an axis line 12e, as shown, connecting the centers of two wheels 15c and 15d, i.e., following the axis line 12e of the wheels 15c and 15d. More preferably, the proximity switches 12c are arranged in an odd number pattern, in a manner such that one proximity switch 12c is placed at a middle point 12f of the axis line 12e and the rest of proximity switches 12c are placed on either side next to the middle proximity switch 12c in a symmetrical pattern. It is preferable that there be five proximity switches 12c.

Once the proximity switches 12c are placed on the axis line 12e of the wheels 15c and 15d as described above, the trajectory of the robot cleaner 10 is easily adjusted according to the signals from the proximity switches 12c, with an adjustment unit consisting of orthogonal rotation/straight movement/orthogonal rotation.

Preferably, the proximity switches 12c used are well-known devices, which indirectly detect metal material within a predetermined sensing distance in the direction of the cleaning surface of the work area.

For example, the proximity switches 12c may be an oscillation type switch that determines existence of metal material by generating an oscillation signal of a predetermined frequency, detecting amplitude variation of the oscillation due to an interaction of the metal material to the magnetic field that is generated by oscillation. The proximity switches 12c may each also comprise a capacitance type switch that determines the existence of a detected object by detecting capacitance variation according to the distance between the detecting electrode and the detected object.

In the preferred embodiment, the proximity switches 12c are oscillation type switches.

Figure 4:
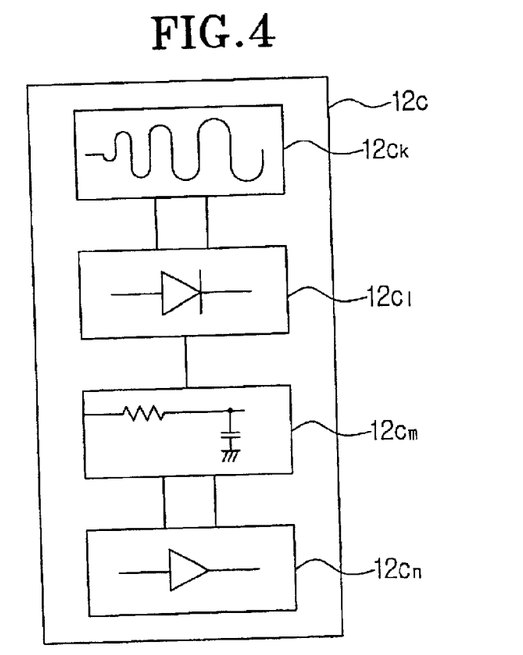
FIG. 4 is a block diagram showing one example of a proximity sensor shown in FIG. 3.

As shown in FIG. 4, the general structure of the oscillation type switches 12c include an oscillator 12Ck, a wave detector 12Cl, and an integrator 12Cm. Depending on the signal sensing ability, an amplifier 12Cn may be provided.

The oscillator 12Ck generates a high frequency oscillation signal through a detection coil arranged adjacent to the detecting surface.

The wave detector 12Cl detects and outputs the oscillation amplitude of the detection coil of the oscillator 12Ck.

The integrator 12Cm integrates the signal outputted through the wave detector 12Cl and outputs the result to the controlling portion 18 through the amplifier 12Cn.

When a detected object, i.e., metal material approaches the magnetic field of high frequency produced from the detection coil by the electromagnetic induction, eddy current is generated at the detected object (metal material). The eddy current is produced against the variation of magnetic flux produced at the detection coil, and the oscillation amplitude of internal oscillation circuit of the oscillator 12Ck is reduced or stopped. The oscillation-type proximity switches 12c detect the existence of the detecting object (metal material) by using such an interaction.

It is preferable that the metal lines detectible by the proximity switches 12c are embedded in the lower portion of the floor.

For example, as shown in FIGS. 6A through 6D, metal lines 61, 63, 65, 67 are formed on a guiding plate 60 in a predetermined pattern. The metal lines 61, 63, 65, 67 are arranged such that line width between the lines correspond to the detecting area of the proximity switches 12c.

More preferably, the metal lines 61, 63, 65, 67 are formed to show exemplary patterns in FIGS. 6A through 6D under the guiding plate 60, which may comprise a floor plate, so as not to be exposed outside. It is further preferable that the guiding plate 60 be formed of a flexible insulating material, except for the metal lines 61, 63, 65, 67.

The preferable thickness of the guiding plate 60 is predetermined and should be within a sensing range of the proximity switches 12c of the robot cleaner 10. For example, the thickness of the guiding plate 60 is preferably below 5 cm.

Figure 6A:
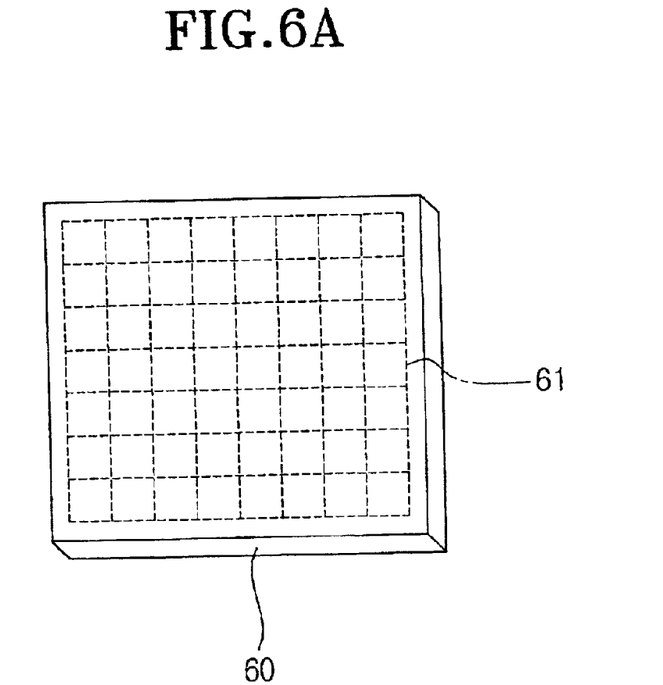
FIGS. 6A through 6D are views showing examples of metal lines employed for use in conjunction with the robot cleaner shown in FIG. 1.
Figure 6B:
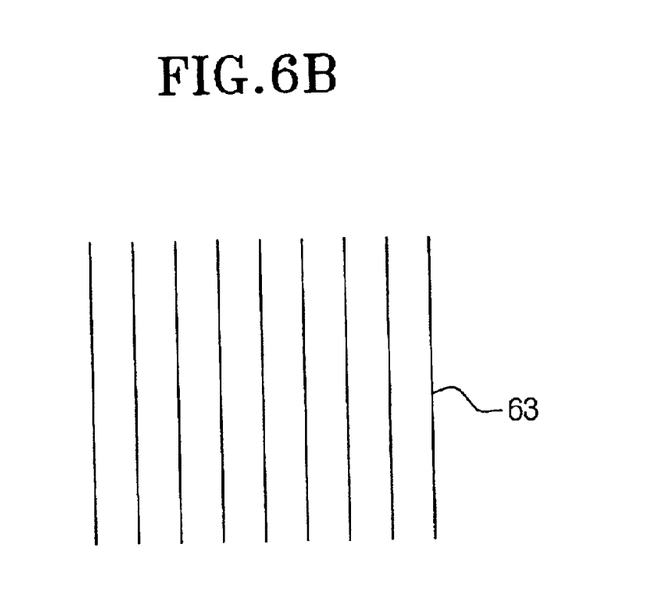
Figure 6C:
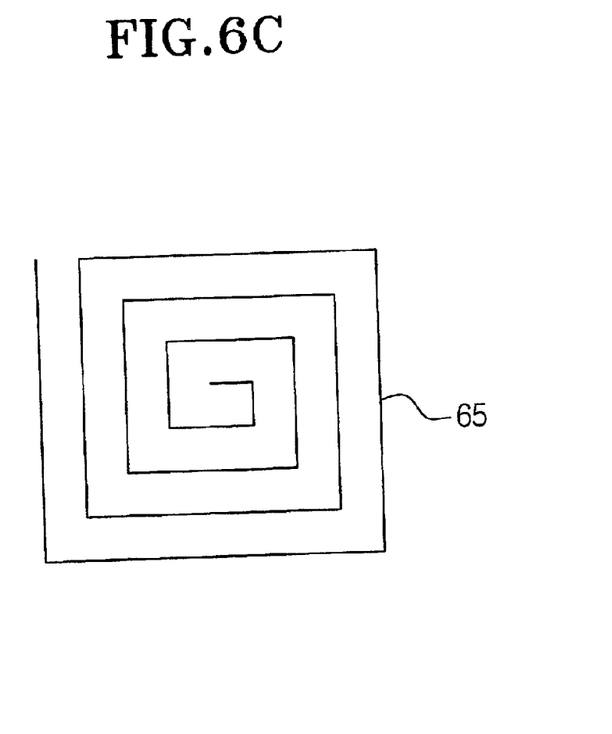
Figure 6D:
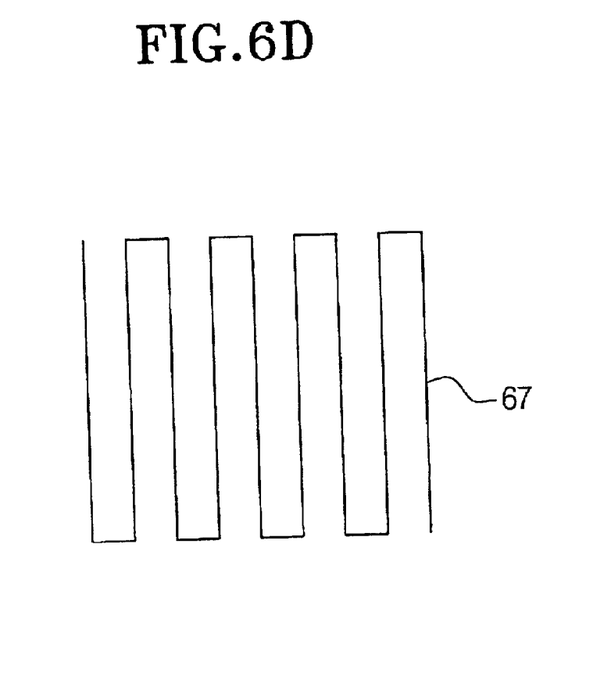

FIG. 6A shows the matrix type metal lines 61 embedded in the guiding plate 60. In this case, when the proximity switches 12c approach the intersection with the metal lines 61, all the proximity switches 12c1 through 12c5 output detection signals. Accordingly, the intersection can be easily detected, and thus, the position of the robot cleaner 10 can be recognized more accurately.

The forward camera 13 is equipped on the body 10a for photographing things ahead and outputting the photographed images to the controlling portion 18.

The driving portion 15 includes a pair of forward wheels 15a, 15b mounted on both forward sides, a pair of rear wheels 15c, 15d mounted on both rear sides, a pair of motors 15e, 15f for rotatably driving the pair of rear wheels 15c, 15d, and a timing belt 15g equipped to transmit driving force generated from the pair of rear wheels 15c, 15d to the pair of forward wheels 15a, 15b. The driving portion 15 drives the pair of motors 15e, 15f according to the control signal from the controlling portion 18 to rotate the pair of motors 15e, 15f independently from each other. Each of the pair of motors 15e, 15f may be rotated bi-directionally. In order to change the advancing direction of the robot cleaner 10, the driving portion 15 may drive the pair of motors 15e, 15f at different RPM or in a direction or speed different for each wheel.

The transceiving portion 17 sends data to be transmitted to an antenna 17a, and transmits a received signal from the antenna 17a to the controlling portion 18.

The battery 19 is mounted on the body 10a to be charged by a charging terminal (not shown). The charging terminal is formed on an outer surface of the body 10a, to be removably connected with an external charging device 30 (FIG. 3).

A battery charge level detecting portion 20 detects the charge level of the battery 19, and generates a signal for charge request when the detected charge level reaches a predetermined lower limit.

The controlling portion 18 processes the signal received through the transceiving portion 17, and controls the other portions of the robot cleaner 10. When a key input device (not shown), having a plurality of keys for manipulating selection of functions of the robot cleaner 10, is provided to the body 10a, or to a remote controller 40, the controlling portion 18 processes the key signals inputted from the key input device.

The controlling portion 18 preferably controls the other respective portions of the robot cleaner 10 so that the robot cleaner 10 maintains connection with the external charging device 30 during non-operation. By maintaining a connection to the external charging device 30 during non-operation, the charge level of the battery 19 can be maintained within an adequate or optimal charge level.

After being separated from the external charging device 30 for an assigned operation, the controlling portion 18 returns the robot cleaner 10 back to the external charging device 30 by using trajectory information obtained by the proximity switches 12c during the traveling of the robot cleaner. The controlling portion 18 may also use the image information memorized in the cameras 13 as supplementary information for performing a return to the external charging device 30 or to an assigned operation.

Here, the "assigned operation" includes a cleaning operation or a monitoring operation through the camera 13.

When the assigned operation is completed, or when the signal for charge request is inputted from the battery charge level detecting portion 20 during the operation, the controlling portion 18 of the robot cleaner 10 calculates a return trajectory to the external charging device 30 by using the trajectory information memorized therein at the time of separating from the external charging device 30, and controls the driving portion 15 to travel along the calculated return trajectory while preventing deviation from the trajectory through the use of inputted signals from the proximity switches 12c.

Preferably, the above-described robot cleaner system is built to externally perform the operation control over the robot cleaner 10, and processes and analyses the image continually photographed by the camera 13.

Accordingly, the robot cleaner 10 is constructed to wirelessly transmit the image continually photographed by the camera 13 to the controlling portion 18, and operates in accordance with the control signal received from controlling portion 18. The remote controller 40 wirelessly controls the robot cleaner 10 with respect to a series of operations, such as a cleaning operation, a returning operation, or the like.

The remote controller 40 includes a wireless relay unit 41 and a central control unit 50. The wireless relay unit 41 processes a wireless signal received from the robot cleaner 10 and transmits the processed signal to the central control unit 50 through a wire, and wirelessly sends the signal received from the central control unit 50 to the robot cleaner 41 through an antenna 42.

Figure 5:
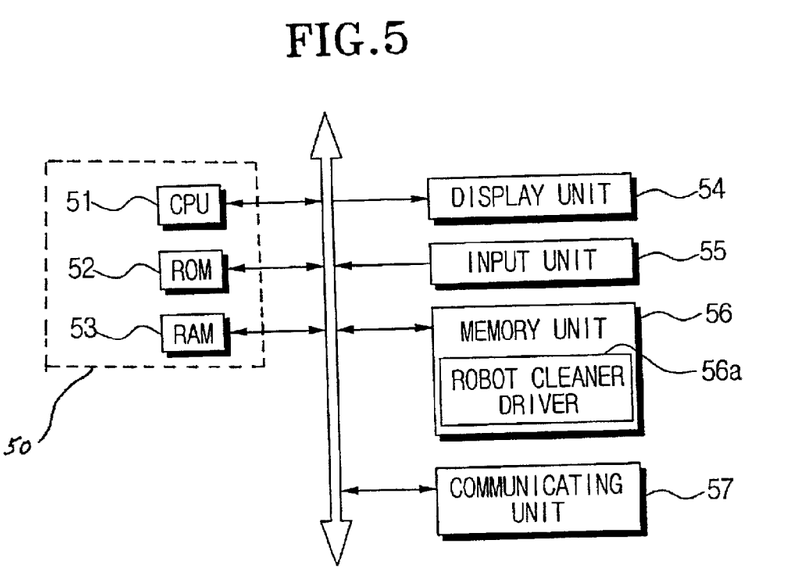
FIG. 5 is a block diagram showing the central control unit shown in FIG. 3.

The central control unit 50 may comprise a central control unit, such as a general computer, an example of which is shown in FIG. 5. As shown in FIG. 5, the central control unit 50 includes a central processing unit (51; CPU), a read-only memory (52; ROM), a random-access memory (53; RAM), a display unit 54, an input unit 55, a memory unit 56, and a communicating unit 57.

The memory unit 56 has a robot cleaner driver 56a installed therein for controlling the robot cleaner 10 and processing a signal transmitted from the robot cleaner 10.

Once executed, the robot cleaner driver 56a provides through the display unit 54 a menu for setting controls for the robot cleaner 10, and processes a series of jobs that allow the menu selected by the user to be carried out by the robot cleaner 10. The menu includes categories of cleaning operation and monitoring operation, having sub-categories of menus supported by the product employing the present invention, such as a list of work area selection, operational method, or the like.

Preferably, the robot cleaner driver 56a is provided with a local area geographical information recognition mode menu, and when the local area geographical information recognition mode is selected, the robot cleaner 10 is separated from the external charging device 30 to travel along the targeting work area, and generates and saves in its memory geographical information about the metal line pattern, using the signal detected and transmitted from the proximity switches 12c.

The robot cleaner driver 56a controls the robot cleaner 10 and instructs it to carry out the assigned job when it is the predetermined operation time, or when received with the operation command signal through the input device 55 by the user.

The controlling portion 18 of the robot cleaner 10 controls the driving portion 15 and/or dust collecting portion 11 in accordance with the control information received from the robot cleaner driver 56a through the wireless relay unit 41. The controlling portion 18 also transmits the image photographed by the camera 13 to the central control unit 50 through the wireless relay unit 41.

During operational controlling, when the battery charging request signal from the robot cleaner 10 or operation complete signal is received through the wireless relay unit 41, the robot cleaner driver 56a calculates a return trajectory to the charging device 30 by using the local area geographical information of the metal lines memorized in the memory unit 56, and controls the robot cleaner 10 to return to the external charging device 30 following the calculated trajectory.

The process of controlling the robot cleaner 10 will be described below in greater detail with respect to FIGS. 7 and 8.

First, a pattern map of the metal lines is generated and saved (step S100). The generation of the pattern map is performed while the user sets up the robot cleaner 10 for use, or while the user selects geographical information recognition mode in the process of updating the geographical information. Further, the pattern map can also be generated every time the robot cleaner 10 separates from the charging device 30.

Next, it is determined whether the operation requesting signal has been received or not (step S110).

If the operation request signal is determined to have been received, a travel path for the assigned job is calculated by using the saved local area geographical information of metal lines (step S120).

Next, the robot cleaner 10 travels along the calculated travel path (step S130). The travel path is determined such that the proximity switch 12c3 located in the middle is as closely opposed and adjacent to the metal line 65 as possible. The robot cleaner 10 travels along the normal travel path as shown by the imaginary circle 'A' in FIG. 7.

Next, it is determined whether the metal line detection signal is inputted from only one of the outermost proximity switches 12c1, 12c5 (step S140). If yes, i.e., if the robot cleaner 10 has deviated from the normal travel path to a position as indicated by the imaginary circles of 'B' and 'C' in FIG. 7, it is determined that the robot cleaner 10 has reached the acceptable limit of the travel trajectory. Accordingly, the robot cleaner 10 is temporarily stopped, and the trajectory adjustment coordinates are calculated for the robot cleaner 10 to return to the normal travel trajectory.

More specifically, if the robot cleaner 10 is at the circle 'B' (FIG. 7), the temporarily stopped robot cleaner 10 is turned rightward by 90° from the normal advancing direction (indicated by the arrow), then advanced straightforward by a distance corresponding to the distance between the proximity switch 12c3 in the middle and one outermost proximity switch 12c1, and then turned leftward by 90° in the normal advancing direction (indicated by the arrow). Accordingly, the proximity switch 12c3 in the middle is positioned to face the metal line. The trajectory adjustment coordinates for a change of direction and the distance of straightforward movement of the robot cleaner 10 are calculated in step S150.

Figure 7:
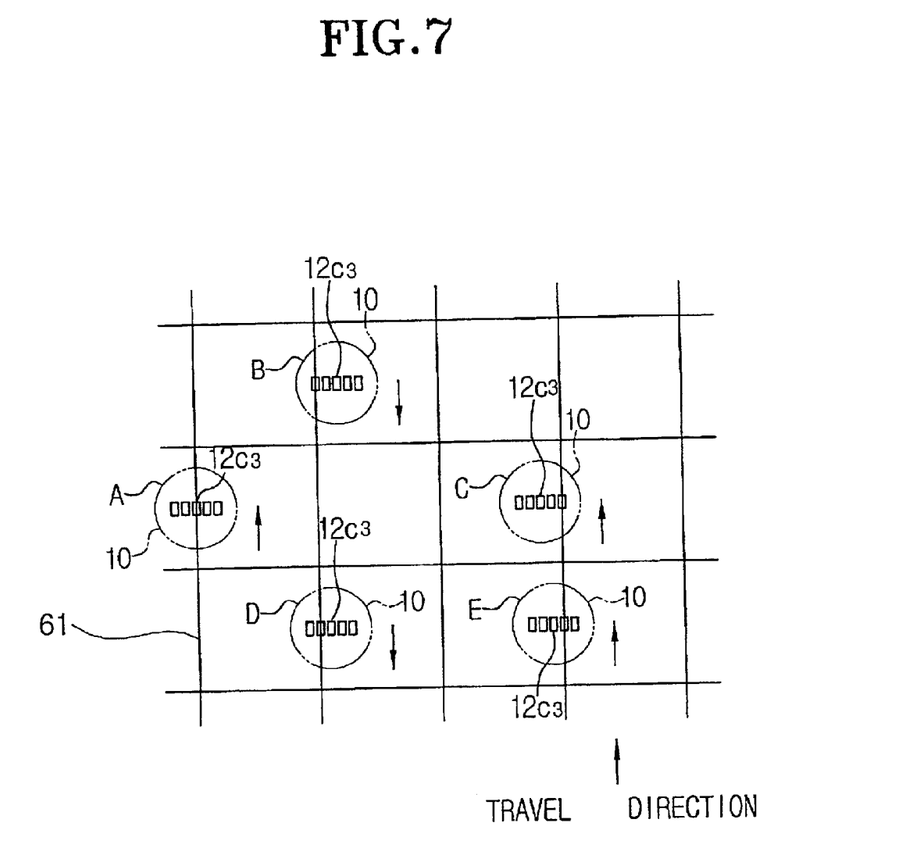
FIG. 7 is a view for explaining the process of adjusting the trajectory of the robot cleaner shown in FIG. 1, while the robot cleaner is traveling along the metal lines.
Figure 8:
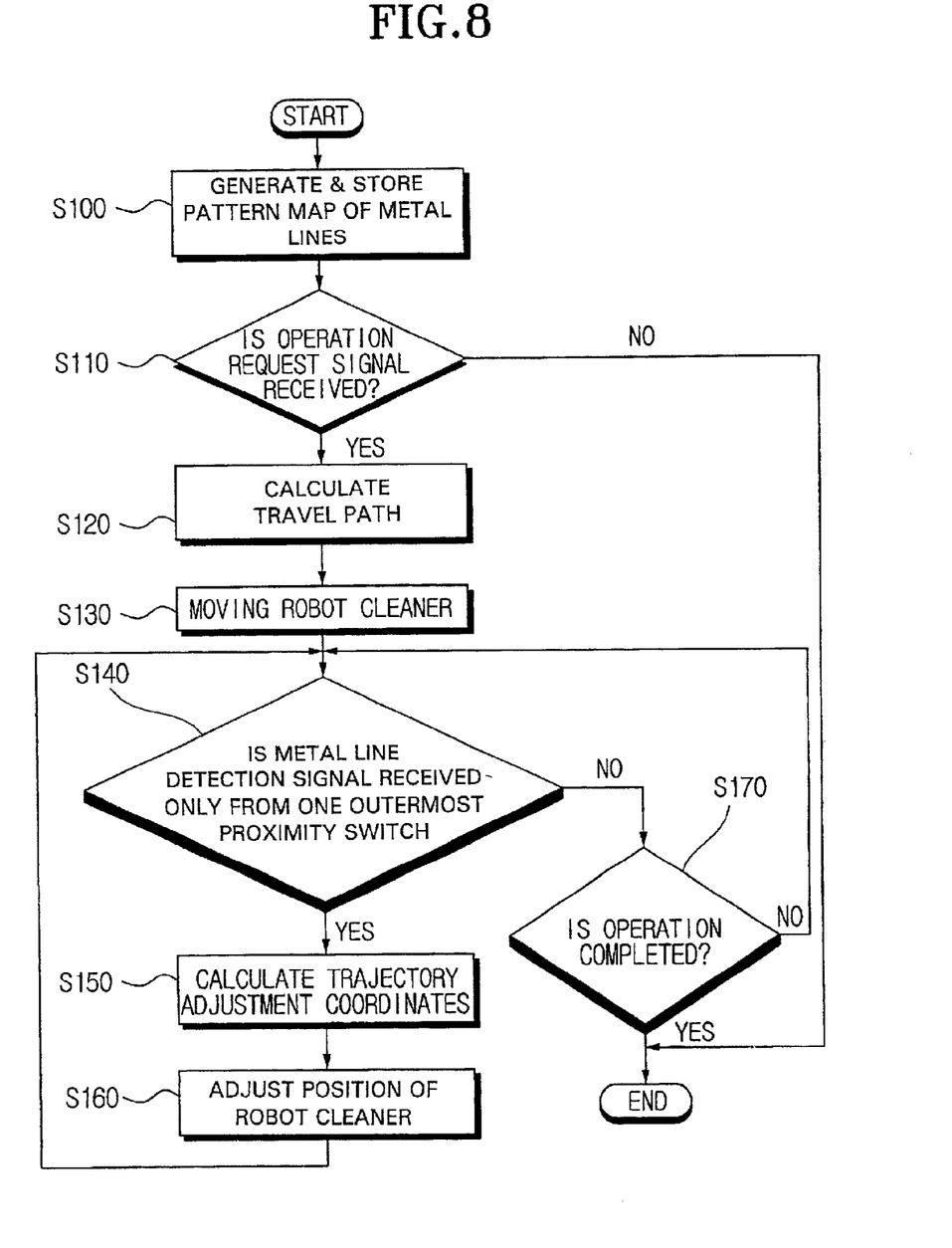
FIG. 8 is a flowchart illustrating the process of track lining adjustment during a cleaning operation of the robot cleaner shown in FIG. 1.

In case the robot cleaner 10 is positioned in the circle 'C' of FIG. 7, the temporarily stopped robot cleaner 10 is turned rightward by 90° from the normal advancing direction, then advanced straightforward by a distance corresponding to the distance between the proximity switch 12c3 in the middle and the other outermost proximity switch 12c5, and then turned leftward by 90° in the normal advancing direction. Accordingly, the proximity switch 12c3 in the middle faces the metal line 61, and the trajectory adjustment compensates for the change of direction and the distance of straightforward movement are calculated in the step S150.

Next, in accordance with the calculated trajectory adjustment coordinates, the driving portion 15 of the robot cleaner 10 is controlled to drive the robot cleaner 10 to return to the normal travel trajectory and then to the next targeting area (step S160).

Meanwhile, in the case of the robot cleaner 10 being positioned in the circles 'D' and 'E' (FIG. 7), i.e., in the case where only the proximity switches 12c2, 12c4 between the outermost proximity switches 12c1, 12c5 and the proximity switch 12c3 in the middle receive the metal line detection signal, the trajectory is adjusted by varying the rotational velocity of the left and right wheels, respectively.

After the above travel processes, and a determination that the operation is completed (step S170), the operation is accordingly finished.

As described above, according to the robot cleaner 10, the system thereof, and the method for controlling the same in accordance with the present invention, recognition of the location of the robot cleaner 10 and the traveling trajectory for the robot cleaner 10 within the work area becomes easier. As a result, the performance of the robot cleaner 10 is improved, while the burden of having to process algorithms is decreased.

Although the preferred embodiment of the present invention has been described, it will be understood by those skilled in the art that the present invention should not be limited to the above-described preferred embodiment, but various changes, alterations and modifications can be made that remain within the spirit and scope of the present invention as defined by the appended claims.

What is claimed is:

1. A robot cleaner for performing a cleaning operation while wirelessly communicating with an external device, comprising:

a body;

a driving portion that drives a plurality of wheels mounted on the body of the robot cleaner;

a dust collecting portion mounted on the body, for collecting dust from a floor surface within a work area;

a plurality of proximity switches arranged on a lower surface of the body facing the floor surface spaced at a predetermined distance from each other, the plurality of proximity switches being arranged and configured for detecting the existence of a metal member in a floor surface, the proximity switches facing in a direction toward the floor surface;

a memory device for storing a travel trajectory by using output signals of the proximity switches;

a controlling portion that generates the travel trajectory, stores the signals at the memory device, calculates a travel distance and a travel trajectory by using an output signal from the proximity switches during the travel of the robot cleaner, and controls the driving portion so that the driving portion performs an assigned job by using the calculated trajectory; and a wireless communication device disposed on board the robot cleaner body for wirelessly communicating with an external device.

2. The robot cleaner of claim 1, wherein the proximity switches comprise:
   an oscillator that oscillates through a detection coil;
   a wave detector that detects an amplitude of oscillation from the wave detection coil; and
   an integrator that integrates and outputs a signal outputted through a wave detecting circuit.

3. The robot cleaner of claim 1, wherein the proximity switches are disposed in a row parallel to a line that connects the axes of those wheels opposed to each other.

4. The robot cleaner of claim 3, wherein the proximity switches are arranged in an odd number pattern such that one proximity switch is placed in the middle of the row parallel the axis connecting line and the rest of the proximity switches are placed next to the one middle proximity switch, in a symmetrical manner.

5. The robot cleaner of claim 4, wherein the number of proximity switches is five.

6. A robot cleaner system, comprising:
   a robot cleaner that performs a cleaning operation while communicating wirelessly with an external device, the robot cleaner having a plurality of proximity switches arranged in a row on a lower portion of the robot cleaner;
   a remote controller including a wireless relay unit for receiving and transmitting a wireless signal from and to the robot cleaner and a control unit having a memory unit; and
   a guiding plate disposed in a floor of a work area, the guiding plate having metal lines formed in a predetermined pattern, the metal lines being detectable by the proximity switches.

7. The robot cleaner system of claim 6, wherein the metal lines are formed on a lower surface of the guiding plate.

8. The robot cleaner system of claim 6, wherein the proximity switches are disposed in a row parallel a line that connects the axes of symmetrically opposed wheels of the robot cleaner.

9. The robot cleaner system of claim 8, wherein the proximity switches are arranged in a row parallel to the axis connecting line in an odd number pattern, in a manner such that one proximity switch is placed in the middle of the axis connecting line and the rest of the proximity switches are placed next to and outwardly of the one middle proximity switch in a symmetrical pattern.

10. The robot cleaner system of claim 9, wherein the number of proximity switches is five.

11. The robot cleaner system of claim 6, wherein the metal lines are formed such that the width between the lines corresponds to a width of a detectible area of each proximity switch.

12. A method for controlling a robot cleaner, the robot cleaner recognizing a travel location by using a detection signal detected by a plurality of proximity switches arranged on a lower surface of the robot cleaner at a predetermined space from each other and from metal lines formed on a floor surface of a work area in a predetermined pattern, the controlling method comprising the steps of:
   generating and storing a pattern map of the metal lines while moving the robot cleaner within the work area;
   when inputted with an operation request signal, recognizing the location of the robot cleaner by comparing the pattern map with the detection signal detected by the proximity switches, and calculating a traveling path from the recognized location to a targeting location; and
   moving the robot cleaner along the floor surface of the work area according to the calculated traveling path while utilizing the metal lines as an indicator of location, wherein odd numbers of at least three proximity switches are arranged in a row and in a symmetrical manner parallel along a line connecting the axes of wheels of the robot cleaner which are opposed to each other, and
   when a detection signal is received from outermost proximity switches during the travel process, changing moving direction such that the metal line can be detected by the proximity switch arranged in the middle.

13. The method of claim 12, wherein at the method of changing moving direction comprising the steps of:
   when a detection signal is received from outermost proximity switches during the travel process, temporarily stopping the travel of the robot cleaner and calculating trajectory adjustment coordinates including change of direction and straightforward moving direction that are required for the metal line detection by the proximity switch arranged in the middle;
   moving the robot cleaner in accordance with the trajectory adjustment coordinates; and when the metal lines are detected by the proximity switch disposed in the middle position, thereby continuing the operation.

* * * * *